(12) United States Patent
Hunt

(10) Patent No.: US 10,117,422 B2
(45) Date of Patent: Nov. 6, 2018

(54) BAIT TRAP

(71) Applicant: Kenneth Hunt, Ravenel, SC (US)

(72) Inventor: Kenneth Hunt, Ravenel, SC (US)

( * ) Notice: Subject to any disclaimer, the term of this patent is extended or adjusted under 35 U.S.C. 154(b) by 133 days.

(21) Appl. No.: 15/273,078

(22) Filed: Sep. 22, 2016

(65) Prior Publication Data

US 2017/0079254 A1    Mar. 23, 2017

Related U.S. Application Data

(60) Provisional application No. 62/284,144, filed on Sep. 22, 2015.

(51) Int. Cl.
*A01K 69/08* (2006.01)

(52) U.S. Cl.
CPC ..................... *A01K 69/08* (2013.01)

(58) Field of Classification Search
CPC ................................ A01K 69/08; A01K 69/06
USPC .......................................................... 43/103
See application file for complete search history.

(56) References Cited

U.S. PATENT DOCUMENTS

| | | | | |
|---|---|---|---|---|
| 616,924 A * | 1/1899 | Heberling | ............. | A01K 97/05 43/100 |
| 846,556 A * | 3/1907 | Dollar | ................... | A01K 69/06 43/100 |
| 2,736,986 A * | 3/1956 | Goldstein | ............. | A01K 69/06 43/103 |
| 3,029,546 A * | 4/1962 | Ruiz | ..................... | A01K 69/06 43/105 |
| 3,176,427 A * | 4/1965 | Hershey | ................. | A01K 69/08 206/0.5 |
| 3,271,894 A * | 9/1966 | Manno | .................. | A01K 69/08 43/100 |
| 3,387,403 A * | 6/1968 | Crouch | .................. | A01K 69/08 220/4.24 |
| 3,916,558 A * | 11/1975 | Crouch | .................. | A01K 69/08 43/100 |
| 4,177,601 A * | 12/1979 | Morton | .................. | A01K 69/08 43/102 |
| 4,221,070 A * | 9/1980 | Swindell | ............... | A01K 69/08 43/100 |
| D273,883 S * | 5/1984 | Sundberg | ..................... | D22/119 |
| 4,452,006 A * | 6/1984 | Steck | ..................... | A01M 1/106 43/107 |
| 5,357,708 A * | 10/1994 | Peters | .................... | A01K 69/06 43/100 |
| 5,613,319 A * | 3/1997 | Botkins | ................. | A01K 69/08 43/100 |
| 6,425,201 B1 * | 7/2002 | Bergacker | ............. | A01K 69/10 43/100 |
| 9,572,328 B1 * | 2/2017 | Head | ...................... | A01K 69/06 |
| 2005/0198892 A1 * | 9/2005 | Lin | ......................... | A01K 69/06 43/100 |

* cited by examiner

*Primary Examiner* — Christopher P Ellis
(74) *Attorney, Agent, or Firm* — Gregory Finch; Finch Paolino, LLC

(57) ABSTRACT

A floating bait trap as shown and described. According to an embodiment, bait trap 100 is generally comprised of a first body portion 102 and a second body portion 104. Bait trap 100 is operable to float in a body of water and trap bait fish, such as minnows, in an interior portion defined by first body portion 102 and a second body portion 104 when mated together.

4 Claims, 4 Drawing Sheets

BAIT TRAP

RELATED APPLICATIONS

This application claims the benefit of U.S. Provisional Application 62/284,144 entitled FLOATING MINNOW TRAP, filed Sep. 22, 2015, hereby incorporated by reference.

FIELD

The present disclosure relates to the field of fishing equipment; in particular, floating bait trap for catching bait fish.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

An object of the present disclosure is a floating trap for bait fish, comprising a first body portion being substantially conical in shape and having side walls defining a bottom portion and a top portion and a plurality of apertures disposed upon a circumference of the side walls extending from the bottom portion to the top portion, the bottom portion having a flange, and the top portion having an inverted conical opening extending from the top portion to an interior portion; a second body portion being substantially conical in shape and having side walls defining a bottom portion and a top portion and a plurality of apertures disposed upon a circumference of the side walls extending from the bottom portion to the top portion, the bottom portion having a flange, and the top portion having an inverted conical opening extending from the top portion to an interior portion, the first body portion and the second body portion being selectively coupled to define an interior portion by mateably engaging the flange of the first body portion and the flange of the second body portion; and, a bait holder having an outer circumference and a basket portion, the outer circumference being selectively secured between the first body portion and the second body portion such that the basket portion is housed in the interior portion defined by the first body portion and the second body portion.

Another object of the present disclosure is a floating trap for bait fish, comprising a first body portion being substantially conical in shape and having side walls defining a bottom portion and a top portion and a plurality of apertures disposed upon a circumference of the side walls extending from the bottom portion to the top portion, the bottom portion having a flange, and the top portion having an inverted conical opening extending from the top portion to an interior portion; a second body portion being substantially conical in shape and having side walls defining a bottom portion and a top portion and a plurality of apertures disposed upon a circumference of the side walls extending from the bottom portion to the top portion, the bottom portion having a flange, and the top portion having an inverted conical opening extending from the top portion to an interior portion, the first body portion and the second body portion being selectively coupled to define an interior portion by mateably engaging the flange of the first body portion and the flange of the second body portion; and, a bait holder having a first portion and a second portion, the first portion and the second portion each having an outer circumference and a basket portion, the first portion and the second portion being selectively coupled to define a bait portion, the outer circumference of the first portion and the second portion being selectively secured between the first body portion and the second body portion such that the bait holder is housed in the interior portion defined by the first body portion and the second body portion.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF DRAWINGS

The above and other objects, features and advantages of the present disclosure will be more apparent from the following detailed description taken in conjunction with the accompanying drawings, in which.

DETAILED DESCRIPTION

Figure 1:
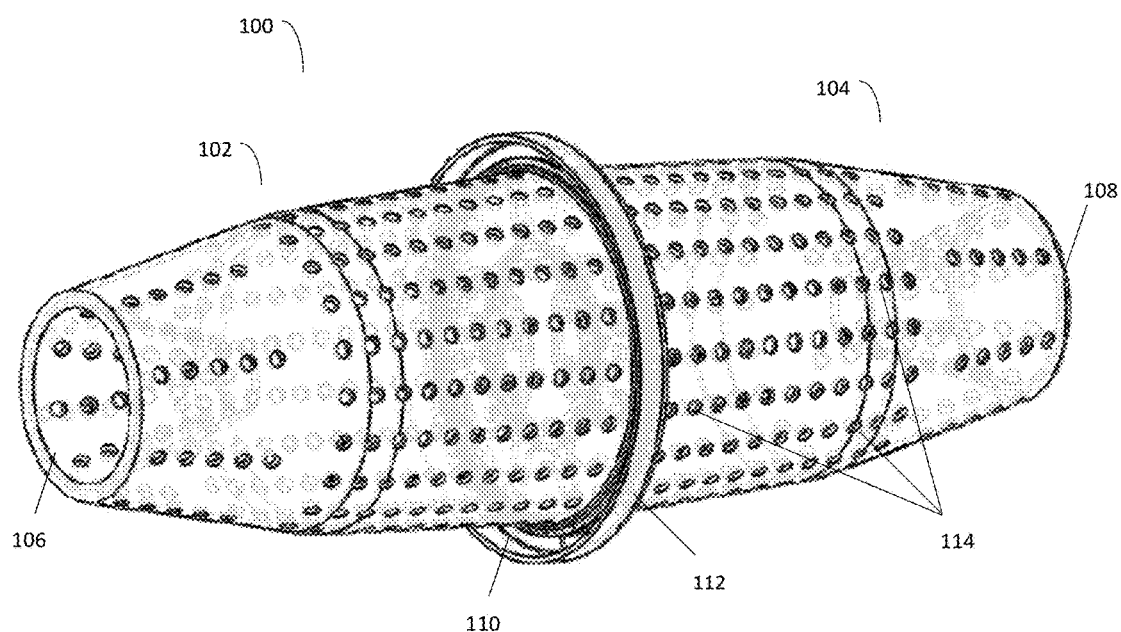
FIG. 1 is an isometric projection of a bait trap in an assembled configuration, according to an embodiment.

Exemplary embodiments are described herein to provide a detailed description of the present disclosure. Variations of these embodiments will be apparent to those of skill in the art. Moreover, certain terminology is used in the following description for convenience only and is not limiting. For example, the words "right," "left," "top," "bottom," "upper," "lower," "first," "second," "inner" and "outer" designate directions in the drawings to which reference is made. The word "a" is defined to mean "at least one." The terminology includes the words above specifically mentioned, derivatives thereof, and words of similar import.

Referring now to FIG. 1, an isometric projection of a bait trap 100 in an assembled configuration is shown. According to an embodiment, bait trap 100 is generally comprised of a first body portion 102 and a second body portion 104. Bait trap 100 is operable to trap bait fish, such as minnows, in an interior portion defined by first body portion 102 and a second body portion 104 when mated together. Bait trap 100 may be constructed of any commercially reasonable plastic material having a density such that bait trap 100 is float when placed in water. First body portion 102 has a bottom flange 110, and a second body portion 104 has a top flange 112. Bottom flange 110 mateably connects to top flange 112 to secure bait trap 100 in an assembled configuration to define an interior compartment. First body portion 102 and a second body portion 104 are substantially conical in shape, and are tapered from a circular opening at a bottom portion defined by bottom flange 110 and top flange 112, respectively, to a top portion defined by fish entry 106 and fish entry 108. Fish entry 106 and fish entry 108 are comprising of an inverted conical opening that extends from a top portion of first body portion 102 and a second body portion 104, respectively, to an interior portion of bait trap 100. First body portion 102 and second body portion 104 have a plurality of apertures 114 disposed throughout the surface of first body portion 102 and second body portion 104. Apertures 114 enable water to flow through bait trap 100, but are sized such that fish caught in an interior portion of bait trap 100 are unable to escape through apertures 114.

Figures 2, 3:
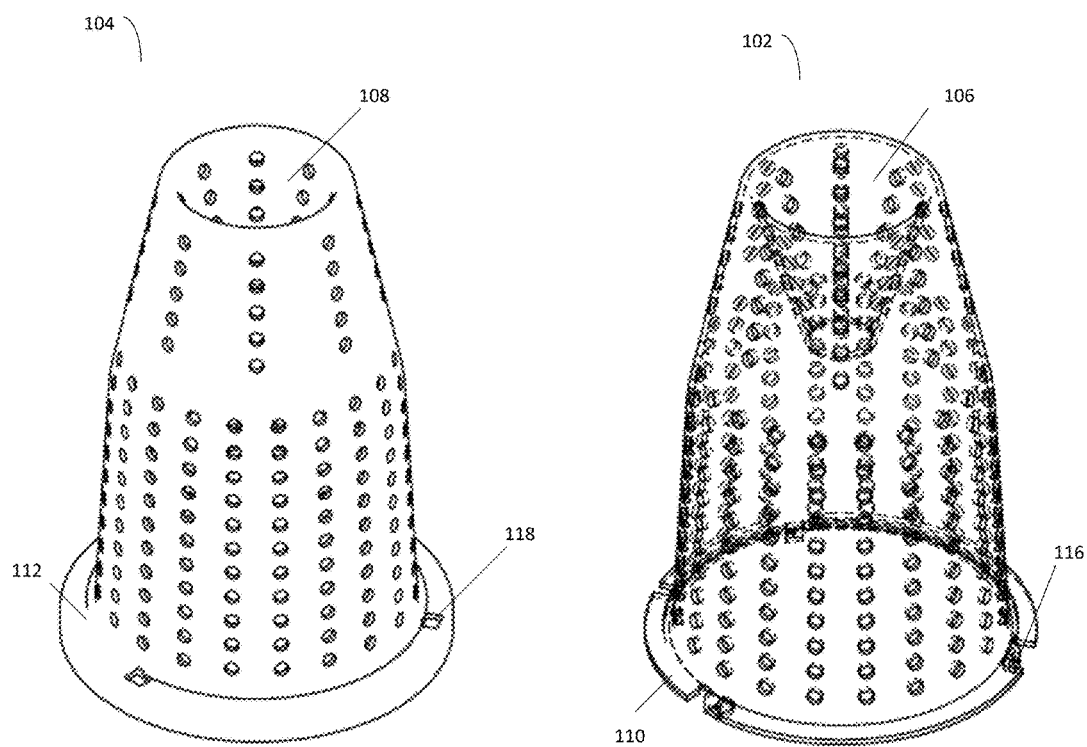
FIG. 2 is an isometric projection of a body portion of a bait trap, according to an embodiment.
FIG. 3 is an isometric projection of a body portion of a bait trap, according to an embodiment.

Referring now to FIGS. 2 and 3, an isometric projection of first body portion 102 and second body portion 104 of a bait trap 100. According to an embodiment, flange 110 is further comprised of a male protrusion 116, and flange 112 is further comprised of a female aperture 118. First body portion 102 and second body portion 104 are selectively coupled together to an assembled configuration, as shown in FIG. 1, by extending male protrusion 116 through female aperture 118 and twisting first body portion 102 and second body portion 104 such that male protrusion 116 and female aperture 118 mateably engage in a locked position. First body portion 102 and second body portion 104 are constructed such that first body portion 102 and second body portion 104 may be stacked inside of each other for ease of storage when in a disassembled configuration. Fish entry 106 and fish entry 108 function to receive bait fish by having an inverted conical shape. Bait fish enter fish entry 106 and fish entry 108 through a larger receiving opening, and are directed to an interior portion of first body portion 102 and second body portion 104 through a smaller opening. Once bait fish are caught in an interior portion of bait trap 100, the fish are unable to navigate the opening in fish entry 106 and fish entry 108, and are trapped in the interior portion of bait trap 100.

Figure 4:
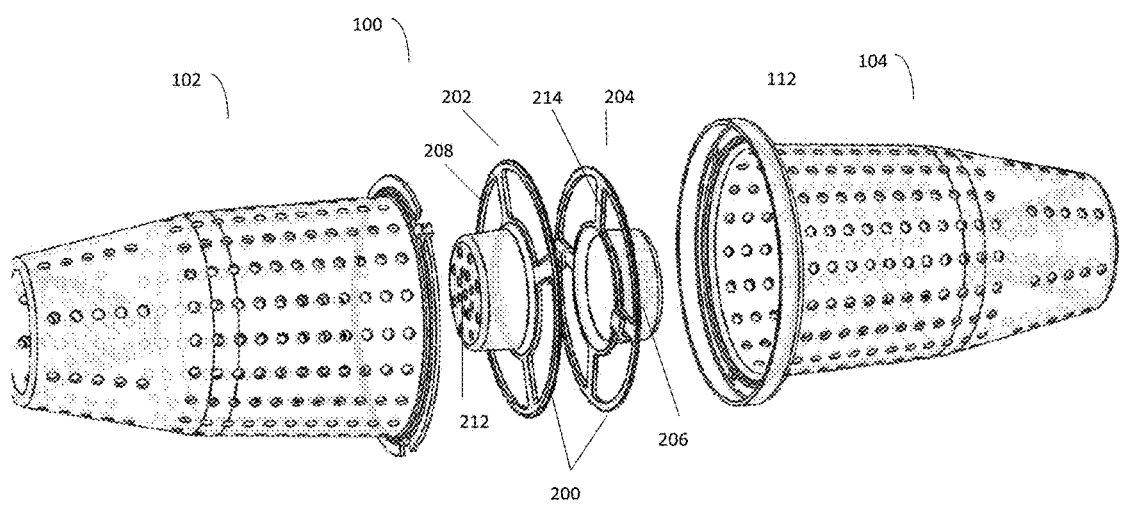
FIG. 4 is an exploded view of a bait trap, according to an embodiment.
Figure 5:
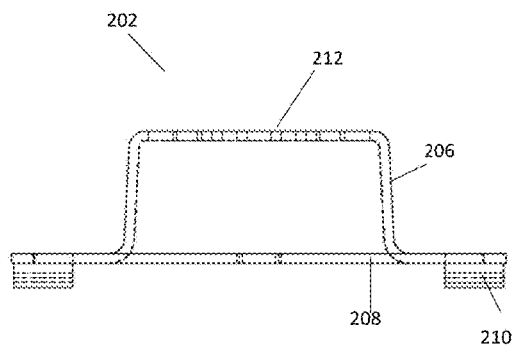
FIG. 5 is a plan view of a bait holder, according to an embodiment.
Figure 6:
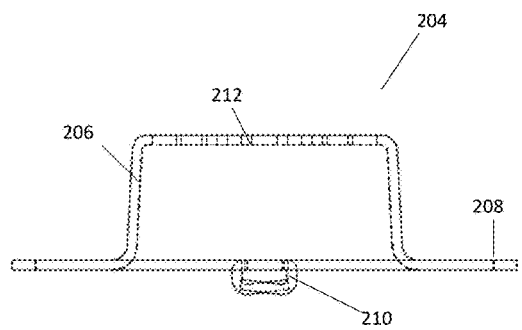
FIG. 6 is a plan view of a bait holder, according to an embodiment.
Figure 7:
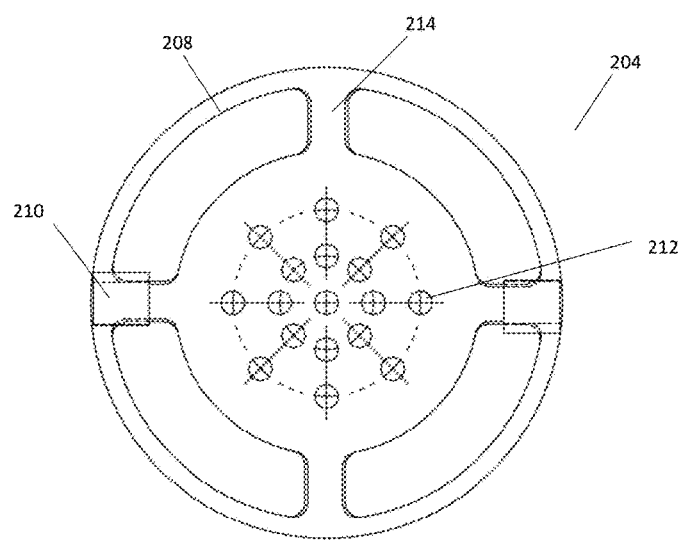
FIG. 7 is a top down view of a bait holder, according to an embodiment.

Referring now to FIG. 4, an exploded view of bait trap 100 is shown. According to an embodiment, bait trap 100 is further comprised of bait holder 200, as further illustrated and referred to in FIGS. 5-7. Bait holder 200 is comprised of a first bait compartment 202 and a second bait compartment 204. First bait compartment 202 and second bait compartment 204 are comprised of bait basket 206 and outer ring 208. Ribs 214 extend from bait basket 206 to outer ring 208 to secure outer ring 208 to bait basket 206. Bait basket 206 further comprises a plurality of apertures 212, such that the bait contained in bait basket 206 can permeate the surrounding water when bait trap 100 is submerged in a body of water. First bait compartment 202 and second bait compartment 204 are further comprised of clips 210. Clips 210 are disposed on ribs 214. Clips 210 on first bait compartment 202 are configured to receive and secure ribs 214 on second bait compartment 204, and vice versa. Outer ring 208 is configured to be secured in a slotted portion of flange 112, and is held in place by mating first body portion 102 and second body portion 104.

A user utilizes bait trap 100 to trap bait fish by placing a desired bait in bait basket 206. Bait may be a manufactured bait cake comprised of ingredients specific to the bait fish the user desires to attract to bait trap 100. Bait basket 206 is circular in shape in an embodiment, but may be a variety of geometric shapes including square, rectangular, triangular, star-shaped, and the like. Once the user places the bait in bait basket 206 of either first bait compartment 202 and second bait compartment 204, the user securably couples first bait compartment 202 and second bait compartment 204 together by coupling clips 210 to ribs 214 of first bait compartment 202 and second bait compartment 204. The coupled bait holder 200 is then placed in a slotted portion of portion of flange 112 of second body portion 104. First body portion 102 and second body portion 104 are selectively coupled together to an assembled configuration by extending male protrusion 116 (as shown in FIG. 3) through female aperture 118 (as shown in FIG. 4) and twisting first body portion 102 and second body portion 104 such that male protrusion 116 and female aperture 118 mateably engage in a locked position. Bait holder 200 is thereby secured in the slotted portion of portion of flange 112 between first body portion 102 and second body portion 104. The user then places bait trap 100 in a selected body of water. Once placed in the water, bait trap 100 floats in the water and the bait contained in bait basket 206 begins to permeate bait holder 200 through the apertures 212 in bait basket 206. The bait further permeates bait trap 100 through the apertures 114 in first body portion 102 and second body portion 104. Bait fish in the vicinity of bait trap 100 are attracted to bait trap 100 due to the scent released from the bait contained in bait holder 200. Bait fish attempt to reach the bait, and are thereby directed to fish entry 106 or fish entry 108. Once bait fish enters the interior portion of bait trap 100 through fish entry 106 or fish entry 108, the bait become trapped in the interior portion of bait trap 100, as most fish are unable to navigate back through the opening in fish entry 106 or fish entry 108 due to its inverted conical shape. After a desire period of time submerged in the body of water, the user removes bait trap 100. The user decouples first body portion 102 and second body portion 104 by twisting in an unlocking direction, and collects the bait fish contained therein. First body portion 102 and second body portion 104 may be stacked for ease of storage.

The present disclosure includes that contained in the appended claims as well as that of the foregoing description. Although this invention has been described in its exemplary forms with a certain degree of particularity, it is understood that the present disclosure of has been made only by way of example and numerous changes in the details of construction and combination and arrangement of parts may be employed without departing from the spirit and scope of the invention.

What is claimed is:

1. A floating trap for bait fish, comprising:
   a first body portion being substantially conical in shape and having side walls, a bottom portion and a top portion and a plurality of apertures disposed upon a circumference of the side walls extending from the bottom portion to the top portion, the bottom portion having a flange, and the top portion having an inverted conical opening extending from the top portion to an interior portion;
   a second body portion being substantially conical in shape and having side walls defining a bottom portion and a top portion and a plurality of apertures disposed upon a circumference of the side walls extending from the bottom portion to the top portion, the bottom portion having a flange, and the top portion having an inverted conical opening extending from the top portion to an interior portion, the first body portion and the second body portion being selectively coupled to define an interior portion by mateably engaging the flange of the first body portion and the flange of the second body portion; and, a bait holder having an outer ring and a basket portion, the outer ring being rigidly secured between the first body portion and the second body portion such that the basket portion is housed in the interior portion defined by the first body portion and the second body portion.

2. The floating trap for bait fish of claim 1 wherein the bait holder further comprises a plurality of apertures disposed upon the basket portion.

3. A floating trap for bait fish, comprising:

a first body portion being substantially conical in shape and having side walls defining a bottom portion and a top portion and a plurality of apertures disposed upon a circumference of the side walls extending from the bottom portion to the top portion, the bottom portion having a flange, and the top portion having an inverted conical opening extending from the top portion to an interior portion;

a second body portion being substantially conical in shape and having side walls defining a bottom portion and a top portion and a plurality of apertures disposed upon a circumference of the side walls extending from the bottom portion to the top portion, the bottom portion having a flange, and the top portion having an inverted conical opening extending from the top portion to an interior portion, the first body portion and the second body portion being selectively coupled to define an interior portion by mateably engaging the flange of the first body portion and the flange of the second body portion; and, a bait holder having a first portion and a second portion, the first portion and the second portion each having an outer ring and a basket portion, the first portion and the second portion being rigidly coupled to define a bait portion, the outer ring of the first portion and the second portion being rigidly secured between the first body portion and the second body portion such that the bait holder is housed in the interior portion defined by the first body portion and the second body portion.

4. The floating trap for bait fish of claim 3 wherein the bait holder further comprises a plurality of apertures disposed upon the basket portion.

* * * * *